(12) United States Patent
Kodama et al.

(10) Patent No.: US 6,571,059 B1
(45) Date of Patent: May 27, 2003

(54) CAMERA INCLUDING A DEVICE FOR CONTROLLING THE PHOTOGRAPHING OPTICAL SYSTEMS TO PREVENT OBSCURING OF AN IMAGE IN THE FINDER OPTICAL SYSTEM

(75) Inventors: Shinichi Kodama, Hino (JP); Yukihiko Sugita, Kokubunji (JP)

(73) Assignee: Olympus Optical Co., LTD, Tokyo (JP)

( * ) Notice: Subject to any disclaimer, the term of this patent is extended or adjusted under 35 U.S.C. 154(b) by 0 days.

(21) Appl. No.: 09/203,233

(22) Filed: Dec. 2, 1998

(30) Foreign Application Priority Data

Dec. 11, 1997 (JP) ............................................... 9-340462

(51) Int. Cl.⁷ ...................... G03B 17/00; G03B 13/02; G03B 13/10
(52) U.S. Cl. .......................... 396/84; 396/373; 396/379
(58) Field of Search ............................. 396/72, 73, 74, 396/75, 373, 377, 379, 84

(56) References Cited

U.S. PATENT DOCUMENTS

| 4,964,686 A | * | 10/1990 | Kato | 359/423 |
|---|---|---|---|---|
| 5,055,868 A | * | 10/1991 | Itoh et al. | 369/379 |
| 5,083,146 A | * | 1/1992 | Ueda | 354/149.1 |
| 5,606,383 A | * | 2/1997 | Daitoku et al. | 396/60 |
| 5,634,147 A | * | 5/1997 | Machida | 396/84 |
| 5,692,227 A | * | 11/1997 | Yokota et al. | 396/377 |
| 5,848,302 A | * | 12/1998 | Machida | 396/60 |

FOREIGN PATENT DOCUMENTS

| JP | 02234111 | * | 9/1990 |
| JP | 04053938 | * | 2/1992 |
| JP | 07261243 A | | 10/1995 |
| JP | 09138464 A | | 5/1997 |
| JP | 09197487 A | | 7/1997 |

\* cited by examiner

Primary Examiner—Christopher Mahoney
(74) Attorney, Agent, or Firm—Volpe and Koenig, P.C.

(57) ABSTRACT

An improved camera includes a photographing optical system and a finder optical system, existing independently from each other. In order that a finder observation image will not be obstructed by a camera lens, the camera comprises a driving circuit for respectively driving the photographing optical system and the finder optical system, and an optical system control circuit for controlling the photographing optical system in a manner such that the finder optical system will not be obstructed by the photographing optical system.

26 Claims, 9 Drawing Sheets

FIG.1

FIG.2A WHEN OFF

FIG.2B W POSITION BEFORE PHOTOGRAPHING

FRONT END POSITION OF LENS-BARREL DURING ZOOMING OPERATION

FIG.2C T POSITION BEFORE PHOTOGRAPHING

FIG.2D W POSITION WHEN PHOTOGRAPHING

FRONT END POSITION OF LENS-BARREL DURING PHOTOGRAPHING OPERATION

FIG.2E T POSITION WHEN PHOTOGRAPHING

CAMERA INCLUDING A DEVICE FOR CONTROLLING THE PHOTOGRAPHING OPTICAL SYSTEMS TO PREVENT OBSCURING OF AN IMAGE IN THE FINDER OPTICAL SYSTEM

BACKGROUND OF THE INVENTION

1. Field of the Invention

This invention relates to a camera, particularly to a driving system for driving a photographing optical system and a finder optical system (with variable magnifications) of a camera in which the photographing optical system and the finder optical system exist independently from each other.

2. Description of the Related Art

For a long time, a camera for taking a picture has usually been an optical device in which a photographing optical system and a finder optical system exist independently from each other. In detail, a commonly used camera device is designed in a manner such that its photographing optical system and its finder optical system are capable of changing in their focal distances.

On the other hand, there has long been a demand that a camera be made compact in size, but there is another demand that a camera's photographing optical system be made to have a long focal distance and a high variable magnification. The above two sorts of demands have been remarkably satisfied in a camera of a kind which uses a compact type film such as IX240 film. However, with such kind of compact camera, it has been found that an interval distance between an optical axis of a photographing optical system and an optical axis of a finder optical system has become shorter than before, and that both the photographing optical system and the finder optical system have longer focal distances and higher variable magnifications.

Since an interval distance between the optical axis of a photographing optical system and the optical axis of a finder optical system has become shorter, and since both the photographing optical system and the finder optical system have longer focal distances and higher variable magnifications, an observation image of the finder optical system will be obstructed by a lens-barrel which holds the photographing optical system, causing an undesirable phenomenon called "eclipse".

In order to solve the above problem, Japanese Unexamined Patent Publication No.7-261243 has suggested a technical solution for prohibiting the eclipse phenomenon by improving some related optical systems involved in a camera.

Further, Japanese Unexamined Patent Publication No.9-138464 has suggested another technical solution for prohibiting the eclipse phenomenon by utilizing a TTL system which can divide an optical path at middle of a camera lens. In addition, Japanese Unexamined Patent Publication No.9-197487 has suggested a further technical solution for prohibiting the eclipse phenomenon by projecting the finder optical system into a different position during a photographing operation.

However, solving an eclipse phenomenon as discussed above has been proved to be not so easy. For instance, the technical solution suggested by Japanese Unexamined Patent Publication No.7-261243 has been proved to be not suitable for use in a camera which has a further higher variable magnification. The technical solution (utilizing a TTL system) suggested by Japanese Unexamined Patent Publication No.9-138464 and the technical solution (projecting the finder optical system into a different position during a photographing operation) suggested by Japanese Unexamined Patent Publication No.9-197487, have been proved to be not suitable for general use because of their complex structures and their large size.

SUMMARY OF THE INVENTION

In view of the above problems associated with the above discussed prior art, it is an object of the present invention to provide an improved camera which is capable of controlling a stop position of a camera lens, so that an observation image of a finder optical system will not have an eclipse phenomenon which would otherwise be caused due to a camera lens-barrel, thereby enabling the camera to have an improved performance and enabling a user to have an improved feeling when using the camera.

As a brief summary, an improved camera made according to the present invention, has a photographing optical system and a finder optical system existing independently from each other, said camera comprising a driving circuit for respectively driving the photographing optical system and the finder optical system, and a control circuit for controlling the photographing optical system in a manner such that the finder optical system will not be obstructed by the photographing optical system.

Other objects and advantages of the present invention will become clearly understood from the following detailed descriptions.

As related above, the present invention provides a camera which has a photographing optical system and a finder optical system existing independently from each other. With the use of the present invention, an optical design can be made easier than before for a compact camera which is compact in size and has an photographing optical system with a high magnification. Meanwhile, the present invention makes it possible to provide a camera capable of easily prohibiting an eclipse phenomenon in an observation image of the finder optical system, so as to prevent the observation image from being obstructed by the photographing optical system.

DESCRIPTION OF THE PREFERRED EMBODIMENTS

In the following embodiments of the present invention, a camera to which the present invention is applied to, has a photographing optical system capable of zooming operation, and a finder optical system capable of zooming operation independently from the zooming operation of the photographing optical system. When a user performs a zooming operation, a zoom optical system of the photographing optical system and a zoom optical system of the finder optical system, may be projected in a predetermined relationship between each other.

In order that an observation image of the finder optical system does not have an eclipse phenomenon (which will otherwise be caused by a lens-barrel of the photographing optical system), one of the most important features of the present invention is that during a zooming operation, the zoom optical system of the photographing optical system in a stand-by condition is located in a position that is different from a position of the zoom optical system of the photographing optical system just before an exposure movement thereof, then the position is adjusted in accordance with a start signal of the exposure movement (for example, a second release signal). Further, in the following embodiments, an entire photographable area in the camera is assumed to be an area possible for a eclipse phenomenon to occur.

Figure 1:
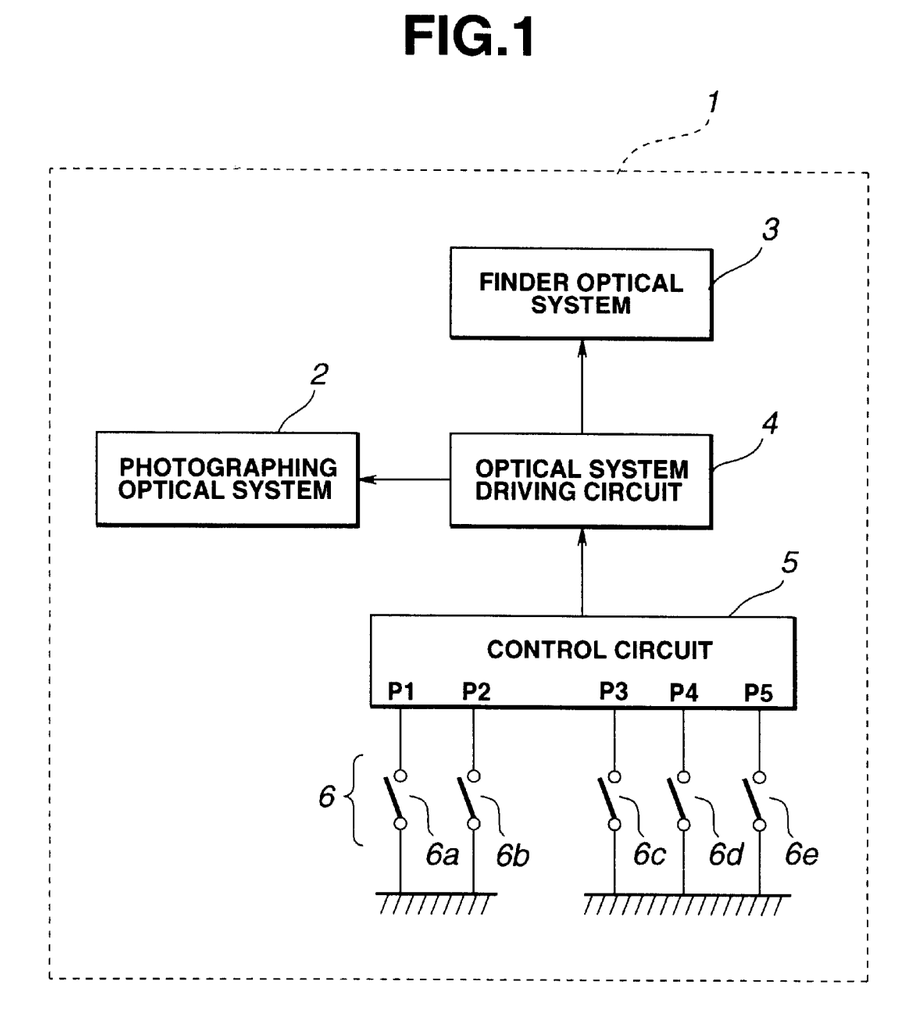
FIG. 1 is a schematic block diagram indicating an embodiment of the present invention.

FIG. 1 is a block diagram indicating an embodiment of the present invention.

Referring to FIG. 1, a camera 1 comprises a photographing optical system 2 capable of zoom operation, a finder optical system 3 provided independently from the photographing optical system 2, an optical system driving circuit 4 for independently driving the photographing optical system 2 and the finder optical system 3, a control circuit 5 for controlling the optical system driving circuit 4, and a group of operating switches 6 provided for a user to operate the camera 1.

The group of operating switches 6 includes a zoom-up switch 6a and a zoom-down switch 6b both of which may be used at the same time to change a focal distance of the photographing optical system 2, a main switch 6c for use as a power switch in camera 1, a first release switch 6d and a second release switch 6c provided to start a series of exposure movements.

The zoom-up switch 6a, the zoom-down switch 6b, the main switch 6c, the first release switch 6d, the second release switch 6e are connected to a plurality of I/O ports P1–P5 connected to the control circuit 5 (through respective ends on one side), and connected to the ground (earth) through respective ends on the other.

The control circuit 5, upon sensing the voltage levels on the I/O ports P1–P5, can detect the contact conditions of the above zoom-up switch 6a, the zoom-down switch 6b, the main switch 6c, the first release switch 6d, and the second release switch 6e.

In this embodiment of the present invention, if a voltage level on an I/O port is high, a switch in connection with the port is determined to be OFF. On the other hand, if a voltage level on an I/O port is low, a switch in connection with the port is determined to be ON.

The optical system driving circuit 4 comprises a driving source such as a stepping motor or a pulse motor, and a driver circuit for driving the driving source. The stepping motor, which serves as a driving source, can also be used to drive other devices (not shown) such as a film winding device and shutter driving mechanism.

The photographing optical system 2 includes a zoom optical system (not shown) capable of changing a focal distance of the photographing optical system 2, and a focusing optical system (not shown) capable of focusing adjustment. The finder optical system 3 also has a zoom optical system (not shown) for changing a focal distance, i.e., changing the magnification of an observation image of the finder. Further, in order that an observation image of the finder optical system 3 will not be obstructed by a part of a lens frame of the photographing optical system 2, a relationship between a focal distance of the photographing optical system 2 and a focal distance of the finder optical system 3 is determined by the control circuit 5.

In operation, a fact that a user has effected a zoom operation will be detected by the control circuit 5 which causes the optical system driving circuit 4 to drive the zoom optical system of the finder optical system 3 by a focal distance corresponding to the above detection. Meanwhile, the optical system driving circuit 4 is operated to drive the zoom optical system of the photographing optical system 2 to a position such that an observation image of the finder will not be obstructed by a lens berral of the photographing optical system 2.

Once a photo signal is detected, the zoom optical system of the photographing optical system 2 is exposed to a zoom position corresponding to a focal distance of the finder optical system 3.

In this way, by disposing the photographing optical system 2 in a position which is different from a position when the photographing optical system 2 is exposed, it is possible for the observation image of the finder optical system 3 to avoid an eclipse phenomenon which is otherwise caused by the lens-barrel of the photographing optical system 2, thereby enabling of a photgraphing operation corresponding to an observation image of the finder optical system 3.

FIG. 2A–FIG. 2E are explanatory views indicating several different positions a camera lens may be located when viewed on its outer appearance.

Figure 2A:
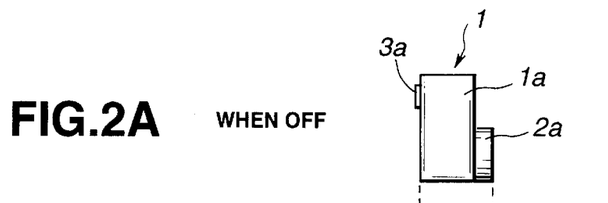
FIG. 2–FIG. 2E are explanatory views indicating various positions of a lens-barrel in different operations, when using the camera of the present embodiment.

FIG. 2A indicates a condition when the main switch 6c is OFF, i.e., a condition when no electric power is supplied to the camera 1. At this time, the front end portion of the lens-barrel 2a of the photographing optical system 2 is located at a rearmost position (i.e., a non-exposed position) with respect to the camera main body 1a. In FIG. 2A–FIG. 2E, a reference numeral 3a is used to represent a finder of the finder optical system 3 (FIG. 1).

Figure 2B:
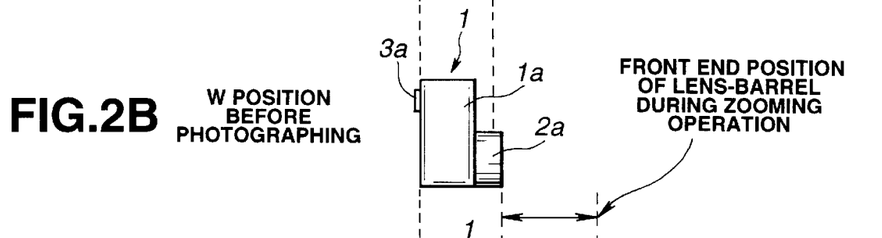

FIG. 2B indicates a condition just after the main switch 6c has been turned ON. Just after the main switch 6c is turned ON, the finder optical system 3 is in its WIDE (hereinafter simply referred to as W) position. The front end portion of the lens-barrel 2a of the photographing optical system 2 will be located in a position rearwardly of a position shown in FIG. 2D.

Figures 2C, 2D:
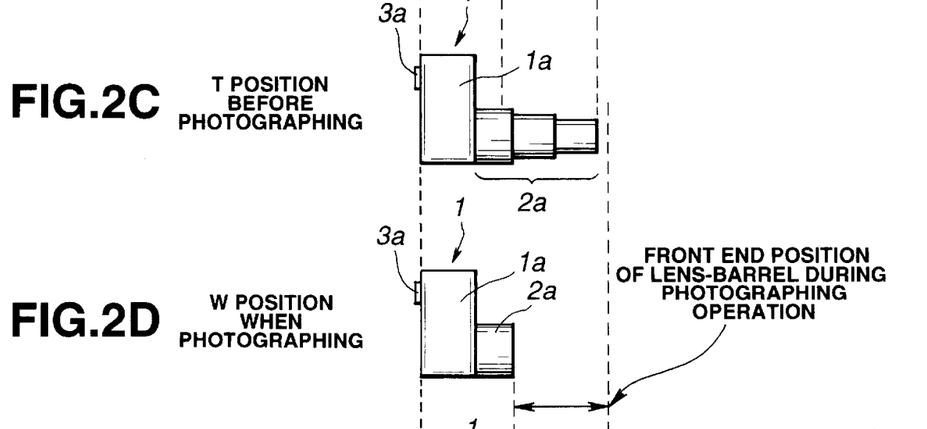

FIG. 2C indicates a condition that after the main switch 6c has been turned ON, the zoom-up switch 6a is operated and the photographing optical system 2 has been moved to a TELE (hereinafter simply referred to as T) position. Under this condition, the finder optical system 3 will be located in a position T, but the front end portion of the lens-barrel 2a of the photographing optical system 2 will be located in a position rearwardly of a position shown in FIG. 2E.

FIG. 2D indicates a condition when the zoom optical system of the photographing optical system 2 is about to be exposed when the finder optical system 3 is in a W position shown in FIG. 2B. If, from a condition shown in FIG. 2B, at first the first release switch 6d and then the second release switch 6e are respectively turned ON, the front end portion of the lens-barrel 2a of the photographing optical system 2 may be moved forwardly of a position shown in FIG. 2B, thereby ensuring that an image almost the same as an image observed by the finder optical system 3 could be directed to the camera film.

Figure 2E:
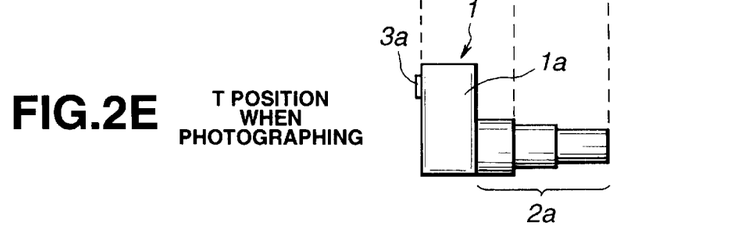

FIG. 2E indicates a condition when the zoom optical system of the photographing optical system 2 is about to be further exposed when the photographing optical system 2 is in a T position shown in FIG. 2C. If, from a condition shown in FIG. 2C, at first the first release switch 6d and then the second release switch 6e are respectively turned ON, the front end portion of the lens-barrel 2a of the photographing optical system 2 may be moved forwardly of a position shown in FIG. 2C, thereby ensuring that an image almost the same as an image observed by the finder optical system 3 could be directed to the camera film.

FIG. 3–FIG. 7 are graphs which are used to indicate a relationship between a focal distance of the finder optical system 3 and a focal distance of the photographing optical system 2. In FIG. 3–FIG. 7, each horizontal axis is used to represent a focal distance of the finder optical system 3, while each vertical axis is used to represent a focal distance of the photographing optical system 2. Further, in FIG. 3–FIG. 7, each broken line is used to indicate a relationship between a focal distance of the finder optical system 3 and a focal distance of the photographing optical system 2 during a time of photographing operation, each solid line is used to indicate a relationship between a focal distance of the finder optical system 3 and a focal distance of the photographing optical system 2 during a time other than photographing operation. Here, for use as the photographing optical system 2, it is preferred to utilize a type which is fabricated such that a larger focal distance can render the camera lens to be extended farther away.

With a common camera, as shown by the broken lines in FIG. 3–FIG. 7, a focal distance of the finder optical system and a focal distance of the photographing optical system are almost the same as one another. Such kind of relationship can also apply to the present embodiment of the present invention, i.e., a focal distance of the finder optical system 3 and a focal distance of the photographing optical system 2 are almost the same as one another. A feature of the present invention is that the camera 1 is so controlled that a focal distance of the finder optical system 3 and a focal distance of the photographing optical system 2 are different from each other except for a time of photographing operation.

During operations other than photographing, the photographing optical system and the finder optical system are controlled in their positions in a manner such that the focal distance of the former is shorter than that of the later, thereby rendering the photographing optical system to be extended by a smaller amount than in a photographing operation.

Referring to FIG. 4–FIG. 7, when the photographing optical system has a focal distance less than zero, it means that the photographing optical system is located between a lens-barrel retracted position (FIG. 2A) and a W position (FIG. 2D). Therefore, in any of FIG. 4–FIG. 7, if there is a solid curve, it means that the photographing optical system has been extended, in accordance with its focal distance, in an amount that is less than its extending amount during a photographing operation.

In any of FIG. 3–FIG. 7, if a broken line and a solid line are too far apart, there will be a too large time lag until the photographing optical system is moved to a photographing position. For this reason, it is preferred to set a position of a focal distance of the photographing optical system during other operations than photographing, in a manner such that a time lag will not be too large and that an eclipse phenomenon can be prevented.

Figure 3:
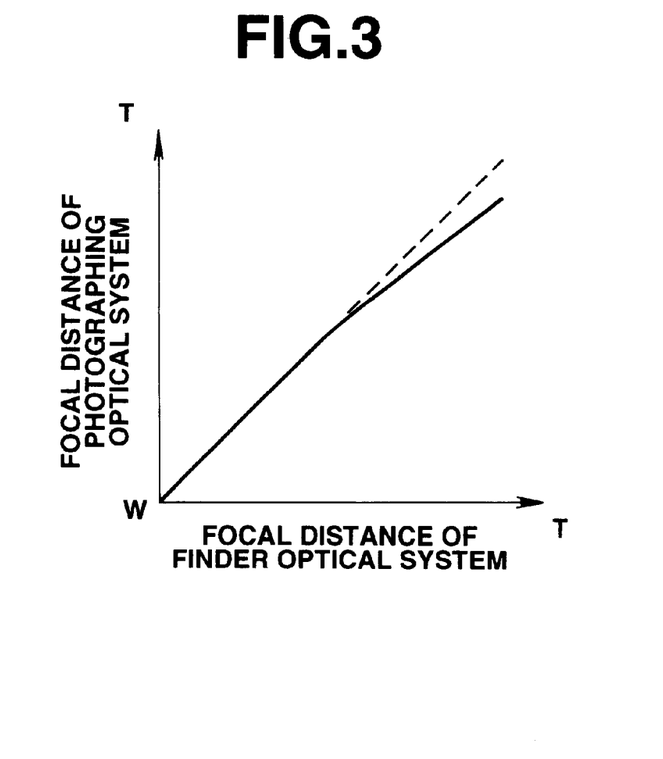
FIG. 3 is a graph indicating various focal distances of the photographing optical system and the finder optical system when an eclipse phenomenon occurs in an observation image of the finder optical system close to T position, while using the camera of the present embodiment.

FIG. 3 indicates, closer to T position, a condition where an eclipse phenomenon occurs in an observation image of the finder optical system. Further, FIG. 3 indicates, closer to W position, a relationship between the finder optical system 3 and the photographing optical system 2, the later of which is used to direct an image corresponding to an observation image of the finder optical system 3, with said relationship being represented by a solid line in the figure. In order to keep said relationship closer to the W position(represented by the solid line), a photograph image of the photographing optical system 2 and an observation image of the finder are kept substantially coincident with each other. On the other hand, as shown by a solid line closer to side T, the focal distance of the photographing optical system 2 is kept smaller than that represented by a broken line, thereby preventing an eclipse phenomenon of an observation image of the finder optical system 3 (said phenomenon is otherwise caused by the lens-barrel). In addition, just before the photographing optical system 2 is exposed towards the camera film, the photographing optical system 2 is driven in a manner such that the focal distance of the photographing optical system 2 will be in a condition represented by the broken line.

Figure 4:
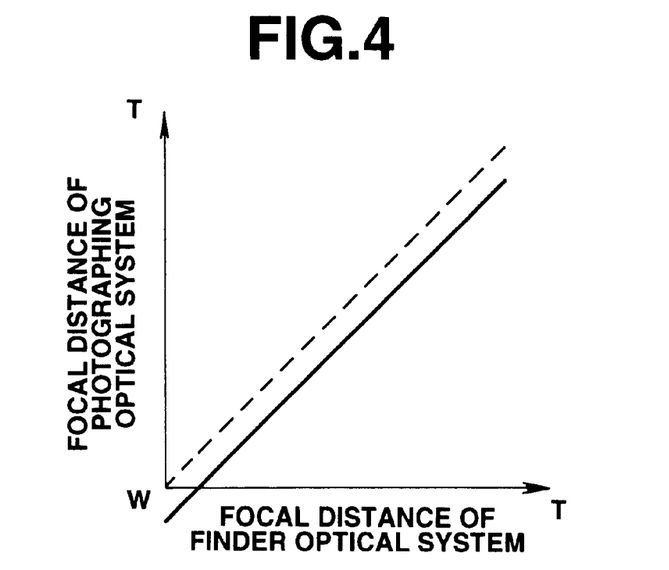
FIG. 4 is a graph indicating various focal distances of the photographing optical system and the finder optical system when an eclipse phenomenon occurs in an observation image of the finder optical system in the whole ranges of the two kinds of focal distances, while using the camera of the present embodiment.

FIG. 4 indicates a condition where an eclipse phenomenon occurs in an observation image of the finder optical system 3 in a whole range of a focal distance. In FIG. 4, a broken line is used to represent a relationship between a focal distance of the finder optical system 3 and a focal distance of the photographing optical system 2 (when the photographing optical system 2 is in a process of being exposed). Before exposing the photographing optical system 2, the photographing optical system 2 is driven under a condition capable of a zooming operation, in a manner such that its focal distance will vary along a solid line in FIG. 4. Under a condition before the photographing optical system 2 is exposed, there would be no eclipse phenomenon in the observation image of the finder optical system 3, which would otherwise be caused by the lens-barrel 2a of the photographing optical system 2. In fact, the photographing optical system 2 is driven in a manner such that just before its exposure movement, its focal distance will change along the broken line in FIG. 4.

Figure 5:
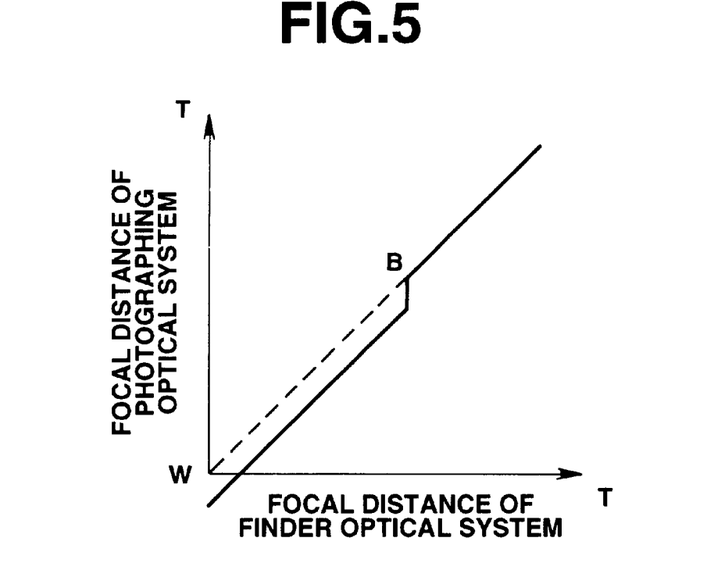
FIG. 5 is a graph indicating various focal distances of the photographing optical system and the finder optical system when an eclipse phenomenon occurs in an observation image of the finder optical system close to W position, while using the camera of the present embodiment.

FIG. 5 indicates, closer to W position, a condition where there occurs an eclipse phenomenon in the observation image of the finder optical system 3. When close to W position, the focal distance of the photographing optical system 2 before exposure, with respect to the focal distance of the finder optical system 3, may be set so as to satisfy a relationship represented by a solid line in FIG. 5. On the other hand, when closer to T position beyond a focal distance represented by a symbol B where the eclipse phenomenon may be prevented, the focal distance of the photographing optical system 2 is set to a condition corresponding to a focal distance of the finder optical system 3.

Figure 6:
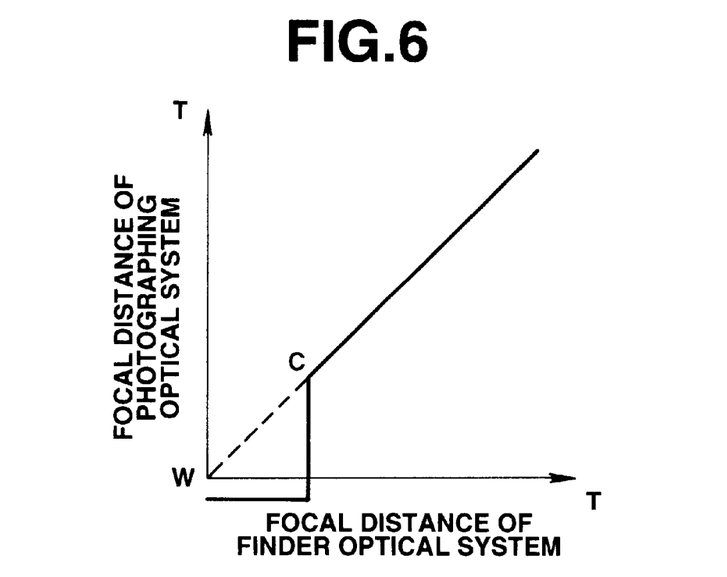
FIG. 6 is another graph indicating various focal distances of the photographing optical system and the finder optical system when an eclipse phenomenon occurs in an observation image of the finder optical system close to W position, while using the camera of the present embodiment.

Similar to FIG. 5, FIG. 6 also indicates, closer to W position, a condition where there occurs an eclipse phenomenon in the observation image of the finder optical system 3. A relationship between a focal distance of the finder optical system 3 and a focal distance of the photographing optical system 2 may be described as follows. Namely, within a focal distance where an eclipse phenomenon will occur, the focal distance of the photographing optical system 2 is fixed. On the other hand, within a focal distance where an eclipse phenomenon will not occur, i.e., from a position represented by a symbol C to an area close to T position in FIG. 6, the focal distance will be equal to a focal distance when the photographing optical system is being exposed.

Figure 7:
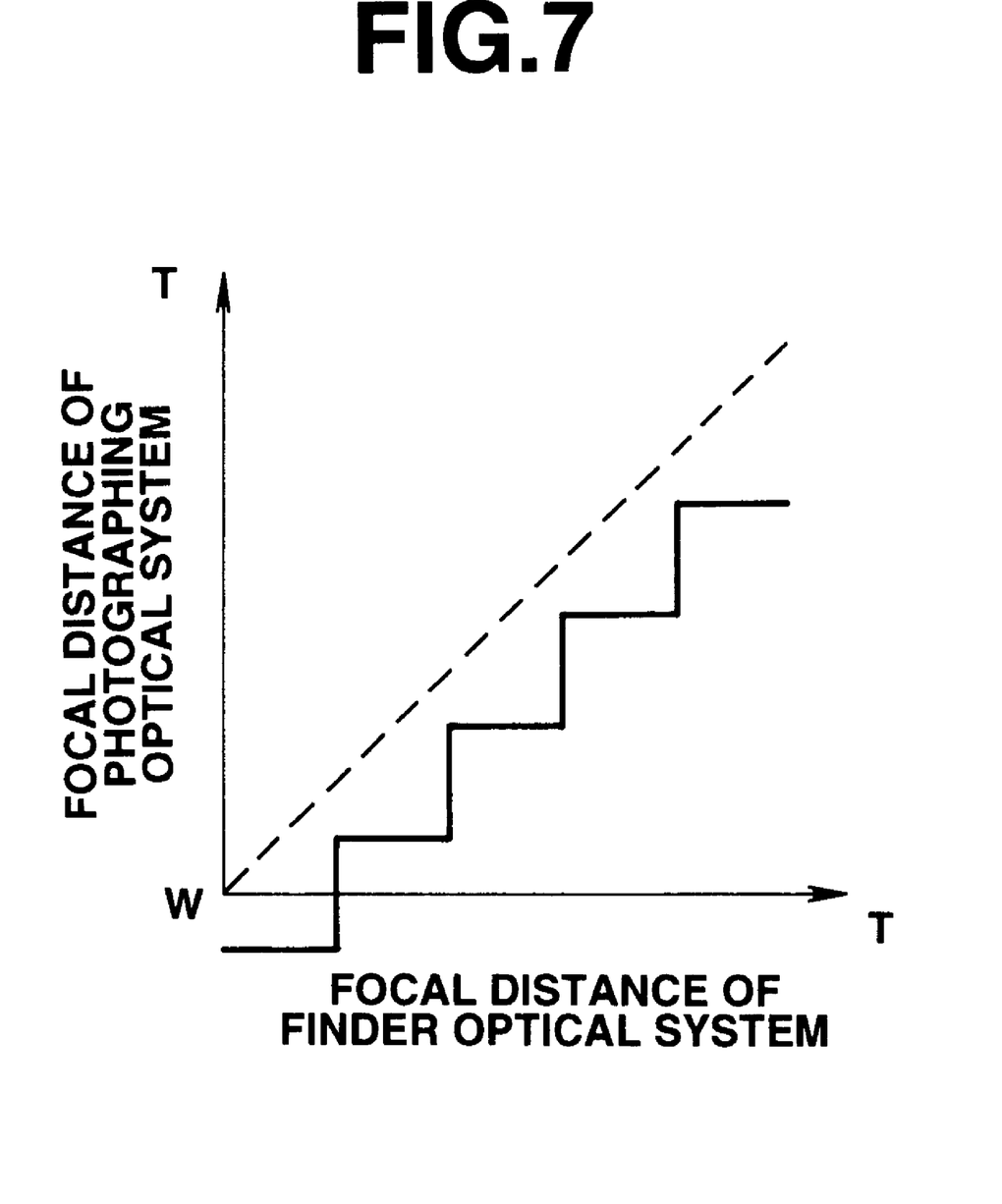
FIG. 7 is another graph indicating various focal distances of the photographing optical system and the finder optical system when an eclipse phenomenon occurs in an observation image of the finder optical system in the whole ranges of the two kinds of focal distances, while using the camera of the present embodiment.

FIG. 7 indicates a condition where the focal distance of the photographing optical system 2 during zooming operation has been changed into a step-like shape, so as to deal with a situation where an eclipse phenomenon occurs in an observation image of the finder optical system 3 in a whole range of a focal distance.

As related above, the change of a focal distance of the photographing optical system 2 with respect to a focal distance of the finder optical distance 3, may be carried out by performing a calculation with the use of a predetermined equation. Further, it is also possible that a focal distance between the finder optical system 3 and the photographing optical system 2 (prior to its exposure) may be stored as table data in a memory means (not shown), and the focal distance of the photographing optical system 2 may be changed based upon the stored data.

Figure 8:
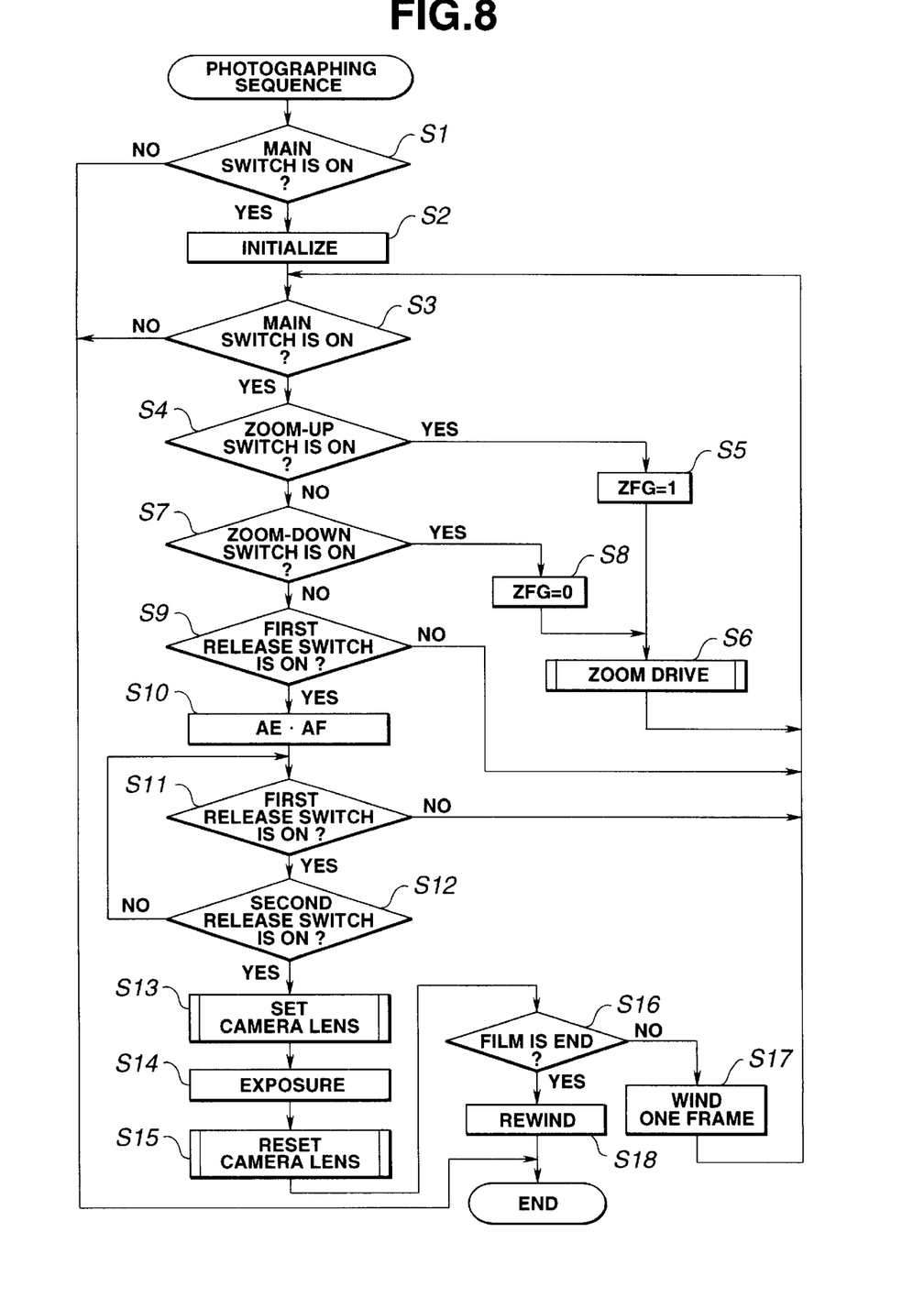
FIG. 8 is a main flow chart indicating an operation of the camera of the present embodiment.

FIG. 8 is a block diagram indicating a flow chart of a photographing sequence of a camera made according to the present embodiment.

At step S1, the state of the main switch 6c is determined. If it is determined that the main switch 6c is ON, the program goes to step S2. On the other hand, if at the step S1 it is determined that the main switch 6c is OFF, then the sequence is terminated.

At step S2, an initialization is executed. Such an operation is performed so that a camera is allowed to have all its functions initialized. The camera 1 of the present embodiment is set such that the focal distance of the finder optical system 3 is at W position, while the front end of the lens-barrel 2a of the photographing optical system 2 is on a position rearwardly of the W position.

Then, the program goes to step S3 where it is again determined whether the main switch 6c is ON or OFF. This operation is performed to determine whether or not the process has diverted from a predetermined sequence. If at step S3 it is determined that the main switch 6c is OFF, this program is terminated. On the other hand, if at step S3 it is determined that the main switch 6c is ON, the program goes to step S4 where it is determined whether or not the zoom-up switch 6a is ON.

If at step S4 it is determined that the zoom-up switch 6a is ON, the program goes to step S5 where a flag in relation to zooming operation (hereinafter referred to as ZFG) is set at 1. Afterwards, the program goes to a "zoom drive" sub-routine at step S6, so as to zoom-drive the finder optical system and the photographing optical system. However, the "zoom drive" sub-routine at step S6 will be described in detail later.

After the "zoom drive" sub-routine at step S6 is finished, the program goes back to step S3 where it is determined again whether the main switch 6c is ON.

If at step S4 it is determined that the zoom-up switch 6a is OFF, the program goes to step S7 where it is determined that whether the zoom-down switch 6b is ON.

If it is determined at Step S7 that the zoom-down switch 6b is ON, the program goes to step S8 where ZFG is set to 0. Subsequently, the program goes to the "zoom drive" sub-routine at step S6, so as to zoom-drive the finder optical system and the photographing optical system. Then, after the "zoom drive" sub-routine at step S6 is finished, the program goes back to step S3 where it is determined again whether the main switch 6c is ON.

In the "zoom drive" sub-routine at step S6, when ZFG is 1, a zoom-up operation is performed on both the finder optical system and the photographing optical system. On the other hand, when ZFG is 0, a zoom-down operation is performed on both the finder optical system and the photographing optical system.

At step S7 if it is determined that the zoom-down switch is OFF, the program will go to step S9 where it is determined whether the first release switch 6d is ON. If it is determined at step S7 that the first release switch 6d is OFF, the program goes back to step S3. On the other hand, if it is determined at step S9 that the first release switch 6d is ON, the program goes to step S10 where an AF treatment for detecting a focusing position and an AE treatment for a photometric operation are carried out.

Then, the program goes to step S11 where it is again determined whether the first release switch 6d is ON. If it is determined at step S11 that the first release switch 6d is OFF, the program goes back to step S3. On the other hand, if it is determined at step S11 that the first release switch 6d is ON, the program goes to step S12.

At step S12 it is determined whether the second switch 6e is ON. If it is determined that the second release switch 6e is OFF, the program goes back to step S11 where it is again determined whether the first release switch 6d is ON. If it is determined at step S12 that the second release switch 6e is ON, the program goes to step S13.

At step S13, a sub-routine for setting the camera lens is carried out in order that the photographing optical system 2 can be driven in accordance with an observation image of the finder optical system 3. The sub-routine for setting camera lens at step S13 will be described in detail below.

After the sub-routine for setting camera lens at step S13 is finished, the program goes to step S14 where an exposure operation is performed which is just the same as that usually performed in a commonly used camera.

Afterwards, the program goes to step 15 where a sub-routine for resetting the camera lens is carried out in order that the photographing optical system 2 can be returned back to a former position in which no eclipse phenomenon will happen. The sub-routine for setting the camera lens at step S15 will be described in detail below.

After the sub-routine for resetting the camera lens at step S15 is finished, the program goes to step S16 where it is determined whether the film is END. This kind of determination is carried out to determine whether the film in a film cartridge has been used up in the exposure operation at this time. If it is determined at step S16 that the film is not END, the program goes to step S17 where the film is winded for one frame. After the film is winded for one frame, the program goes back to step S3.

On the other hand, if it is determined at step S16 that the film is END, the program goes to step S18 where the film is rewinded. After rewinding the film, this program is terminated.

Figure 9:
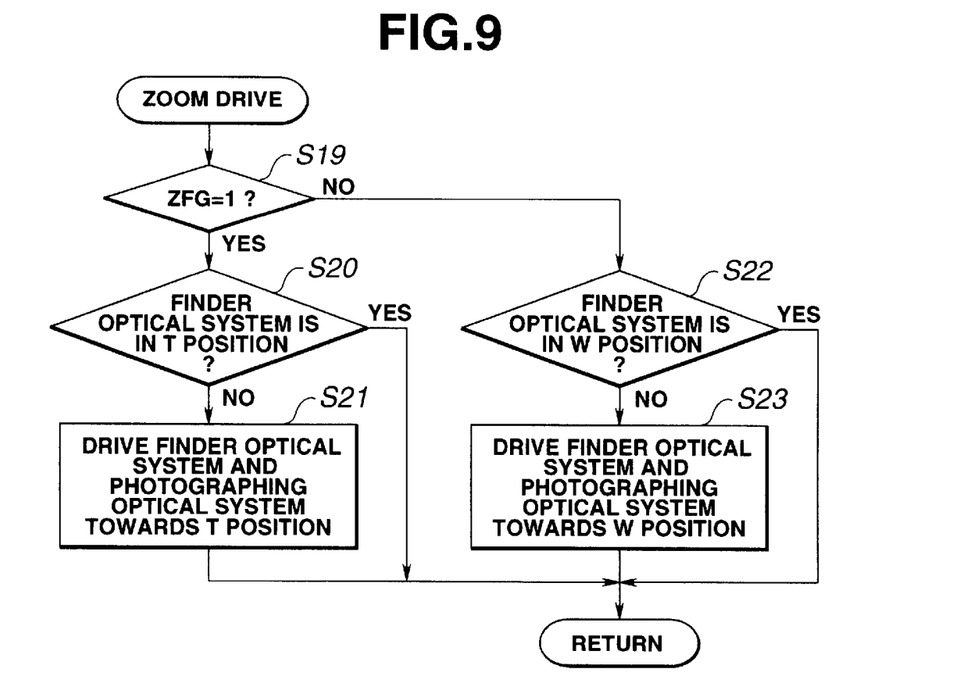
FIG. 9 is a flow chart indicating a sub-routine for zoom driving treatment when using the camera of the present embodiment.

The "zoom drive" sub-routine at step S6 will be described in detail with reference to FIG. 9.

When carrying out the "zoom drive" sub-routine, at first, it is determined at step S19 whether ZFG is equal to 1. If it is determined that ZFG is equal to 1, this means that the zoom-up switch 6a is ON. Thus, the program goes to step S20 where it is determined whether the focal distance of the finder optical system 3 is in T position. If it is determined at step S20 that the focal distance of the finder optical system 3 is in T position, the program goes back to step 6 in the main routine.

On the other hand, if it is determined at step S20 that the focal distance of the finder optical system 3 is not in T position, the program goes to step S21 where the zoom optical system (not shown) of the finder optical system 3 and the zoom optical system (not shown ) of the photographing optical system 2, are driven by a predetermined amount towards T position so as to change their focal distances. After that, the program returns back to step S6 in the main routine.

Nevertheless, if it is determined at step S19 that ZFG is not equal to 1, this means that the zoom-down switch 6b is ON. Thus, the program goes to step S22 where it is determined whether the focal distance of the finder optical system 3 is in W position. If it is determined at step S22 that the focal distance of the finder optical system 3 is in W position, the program returns back to step 6 in the main routine.

However, if it is determined at step S22 that the focal distance of the finder optical system 3 is not in W position, the program goes to step S23 where the zoom optical system of the finder optical system 3 and the zoom optical system of the photographing optical system 2, are driven by a predetermined amount towards W position so as to change their focal distances. Subsequently, the program returns back to step S6 in the main routine.

The "zoom drive" sub-routine at step S6 shown in FIG. 8 is thus carried out in accordance with the above sequence.

Figure 10:
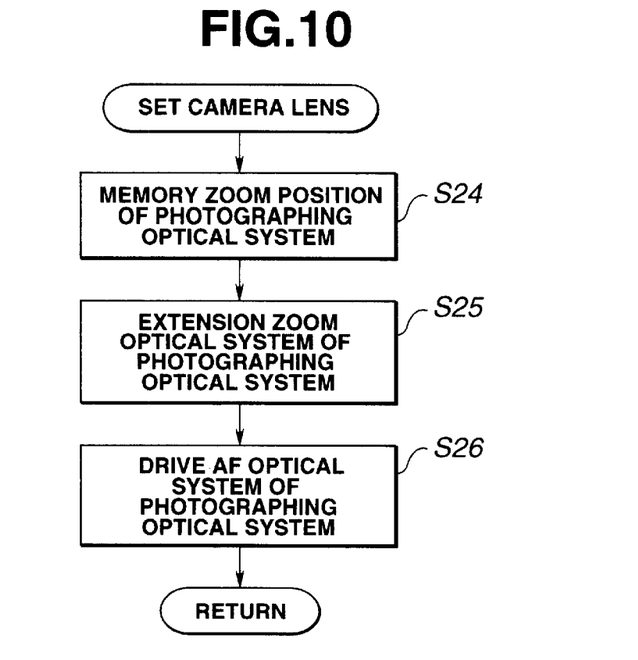
FIG. 10 is a flow chart indicating a sub-routine for setting the camera lens when using the camera of the present embodiment.

FIG. 10 is used to describe in detail a "camera lens setting" sub-routine which is to be carried out at step S13.

When carrying out the "camera lens setting" sub-routine, at first, in step S24 the position of the zoom optical system of the photographing optical system 2 is memorized. Then, the program goes to step, S25 where the zoom optical system of the photographing optical system is driven so as to be extended until arriving at a focal distance corresponding to the finder optical system 3. After such driving operation is finished, the program goes to step S26 where the focusing optical system of the photographing optical system is driven towards a predetermined position. Then, the program returns back to step S13 in the main routine as shown in FIG. 8.

The "camera lens setting" sub-routine at step S13 shown in FIG. 8 is thus carried out in accordance with the above sequence.

Figure 11:
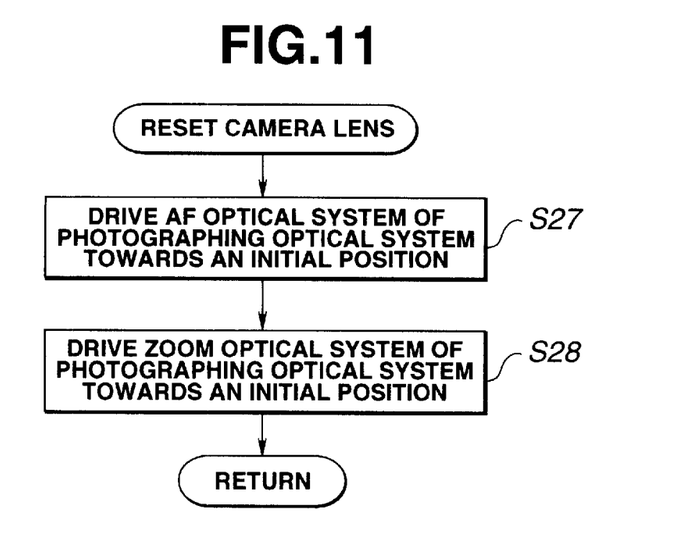
FIG. 11 is a flow chart indicating a sub-routine for resetting the camera lens when using the camera of the present embodiment.

FIG. 11 is used to describe in detail a "camera lens resetting" sub-routine which is to be carried out at step S15. When carrying out the "camera lens setting" sub-routine, at first, in step S27 the focusing optical system of the photographing optical system 2 is driven towards an initial position. Then, the program goes to step, S28 where the zoom optical system of the photographing optical system 2 is returned to a position memorized at step, S24 in the above "camera lens setting" sub-routine. After that, the program returns back to step S15 in the main routine as shown in FIG. 8.

The "camera lens resetting" sub-routine at step S15 shown in FIG. 8 is thus a carried out in accordance with the above sequence.

Figure 14:
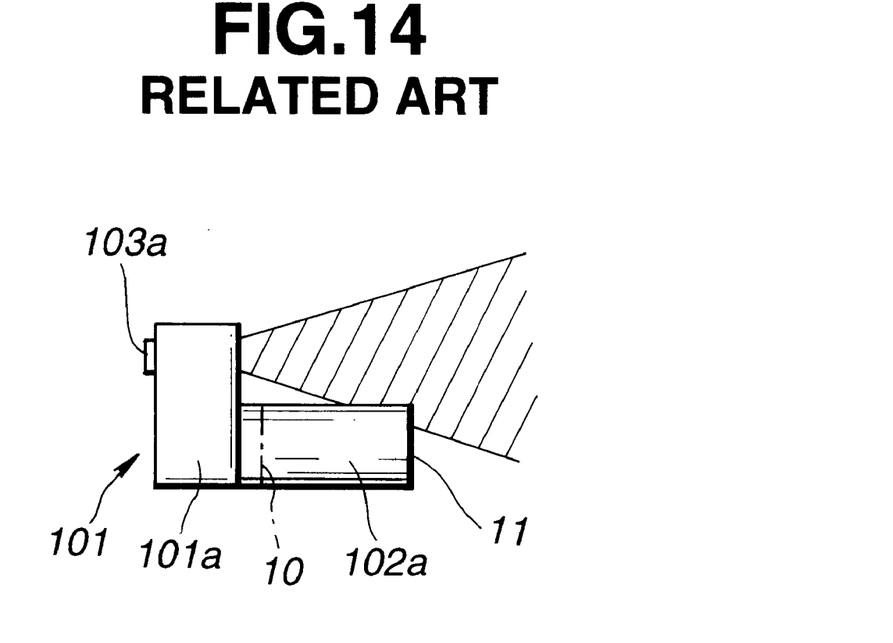
FIG. 14 is a schematic explanatory view illustrating an operation of a photographing optical system when using a camera made according to a prior art.
Figure 15:
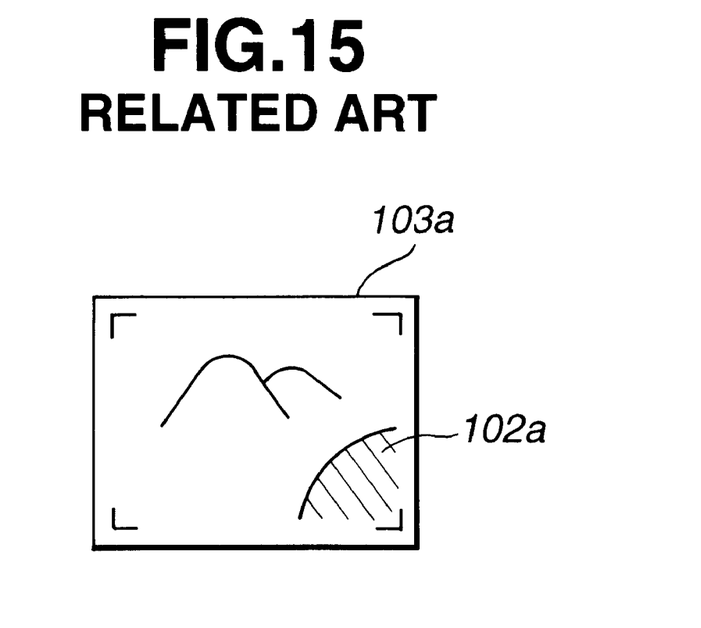
FIG. 15 is a schematic explanatory view illustrating an observation image of the finder optical system of the camera shown in FIG. 14, made according to a prior art.

In a prior art, as shown in FIG. 14, a compact camera 101 is usually made such that an interval between the optical axis of the photographing optical system and that of the finder optical system is small. Thus, when a zooming operation is carried out prior to a predetermined photographing operation, the lens-barrel 102a of the photographing optical system is moved from the lens retracted position 10 to a desired position required to carry out an actual photographing operation. As a result, an observation image (as shown in FIG. 15 obtained by the finder 103a of the finder optical system will be partially obstructed by a front portion of the lens-barrel 102a.

Accordingly, with the above compact camera 101, when a person actually peeps into the finder 103a, the lens-barrel 102a will undesirably appear to partially obstruct the observation image of the finder 103a. Consequently, it will be difficult to determine a desired scope for taking a photograph.

Figure 12:
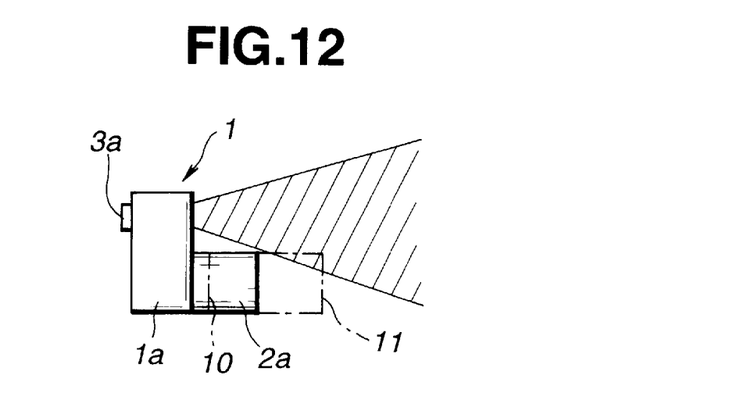
FIG. 12 is a schematic explanatory view illustrating an operation of the photographing optical system when using the camera of the present embodiment.

In contrast, with the camera made according to the present invention, as shown in FIG. 12, prior to actually taking a photograph, the lens-barrel 2a is located between a lens retracted position 10 and a photographing position 11. During an actual operation for taking a photograph (when exposing the camera lens-barrel), the lens-barrel 2a is moved to a photographing position 11.

Figure 13:
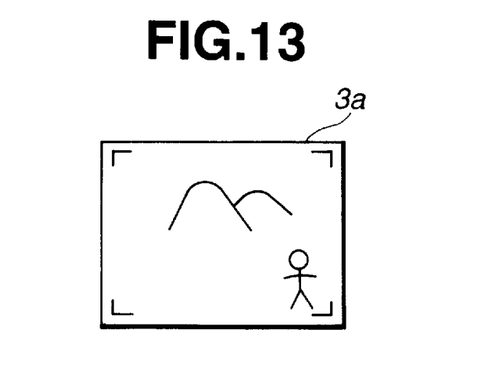
FIG. 13 is a schematic explanatory view illustrating an observation image of the finder optical system of the camera shown in FIG. 12, made according to the present embodiment.

In this way, when a user peeps into the finder 3a to carry out an actual photographing operation, prior to an actual photographing operation (when exposing the camera lens-barrel), the observation image of the finder 3a does not involve the lens-barrel 2a. Therefore, it is easy to determine a desired photographing area, making it possible to observe an entire area of the observation image of the finder 3a.

With the use of the camera made according to the embodiment of the present invention, it is possible for a camera having a high variable magnification but compact in size, to easily prevent an eclipse phenomenon which is otherwise possibly caused by a camera lens.

Although in the above embodiment a detailed description has been given to a driving system adapted to drive both the photographing optical system and the finder optical system, it is also possible to form a different arrangement where the photographing optical system and the finder optical system are driven independently with the use of different driving sources provided independently from each other. Further, it is allowed to provide only one driving source which may be properly transmitted to both the photographing optical system 2 and the finder optical system 3, with the use of a driving force transmission system and a differential driving system.

As a driving force, it is permitted to use other kinds of actuators than a motor. For example, it is allowed to use a structure such as a solenoid to obtain a desired driving source.

Further, it is possible to provide another actuator which is used for obtaining an effect that in a photographing operation, a photographic image formed by the photographing optical system 2 may be made coincident with an observation image of the finder optical system 3. Alternatively, it is allowed to provide another actuator which is used for obtaining an effect that in a photographing operation, the photographing optical system 2 may be made coincident with an observation image of the finder optical system 3, and to control the actuator by means of an operating section for effecting a zooming operation, thereby permitting the use of only a single one actuator to drive the finder optical system 3 and the photographing optical system 2 in a predetermined operational relation.

Further, the photographing optical system 2 may be located at any desired positions, provided that the finder optical system 3 is not located in an eclipse position except during an exposure time when the photographing optical system is being exposed. On the other hand, if a driving amount is made small, it is possible to reduce an undesired time lag from an exposure start signal (a switch-on signal of the second release switch), thereby ensuring a good performance for the operation of the camera.

The present invention may involve different examples and embodiments, but it is understood that these examples and embodiments can all be formed employing the same principle, without departing from the spirit and scope of the present invention. In addition, although the present invention is limited to the scope defined by the claims appended therewith, the invention should not be limited to the specific embodiments as described in the present specification.

What is claimed is:

1. A camera having a photographing optical system and a finder optical system existing and moveable independently from each other, said camera comprising:
    a driving circuit for driving the photographing optical system; and
    a control circuit adapted to effect a desired control, such that the photographing optical system may be located in a position capable of preventing an eclipse phenomenon in the finder optical system, and that if a photographing magnification of the photographing optical system is different from an observation magnification of the finder optical system, the photographing optical system may be moved to a position capable of rendering a photographing magnification of the photographing optical system to be substantially equal to an observation magnification of the finder optical system, in an initial period of photographing operation.

2. A camera having a photographing optical system and a finder optical system existing independently from each other, said camera comprising:
    a driving circuit for respectively driving the photographing optical system and the finder optical system;
    a control circuit for controlling the photographing optical system in a manner such that an image viewed through the finder optical system will not be obstructed by the photographing optical system; and
    wherein the control circuit is adapted to independently control a focal distance of the photographing optical system and a focal distance of the finder optical system.

3. A camera having a photographing optical system and a finder optical system existing independently from each other, said camera comprising:
    a driving circuit for respectively driving the photographing optical system and the finder optical system;
    a control circuit for controlling the photographing optical system in a manner such that an image viewed through the finder optical system will not be obstructed by the photographing optical system; and
    wherein the control circuit is adapted to effect a desired control such that an exposure operation is carried out only after the photographing optical system has been driven to its focal distance corresponding to a focal distance of the finder optical system at a timing just before an actual photographing operation.

4. A camera having a photographing optical system and a finder optical system existing independently from each other, said camera comprising:
    a driving circuit for respectively driving the photographing optical system and the finder optical system;
    a control circuit for controlling the photographing optical system in a manner such that an image viewed through the finder optical system will not be obstructed by the photographing optical system; and
    wherein the control circuit is adapted to effect a desired control such that an exposure operation is carried out only after the photographing optical system has been driven so that a photographing magnification may be obtained corresponding to a finder magnification of the finder optical system, at a timing just before an actual photographing operation.

5. A camera having a photographing optical system and a finder optical system existing independently from each other, said camera comprising:
    a driving circuit for respectively driving the photographing optical system and the finder optical system;
    a control circuit for controlling the photographing optical system in a manner such that an image viewed through the finder optical system will not be obstructed by the photographing optical system; and
    wherein the control circuit is adapted to effect a desired control, such that the photographing optical system is extended by a smaller amount than would be necessary for it to be in a position corresponding to a focal distance of the finder optical system.

6. A camera which has a photographing optical system and a finder optical system existing independently from each other, said camera comprising:
    a driving circuit for respectively driving the photographing optical system and the finder optical system;
    a control circuit for controlling the photographing optical system in a manner such that a focal distance of the photographing optical system is different from a focal distance of the finder optical system, so that an image viewed through the finder optical system will not be obstructed by the photographing optical system.

7. The camera according to claim 6, wherein the control circuit is adapted to independently control a focal distance of the photographing optical system and a focal distance of the finder optical system.

8. The camera according to claim 6, wherein the control circuit is adapted to effect a desired control such that an exposure operation is carried out only after the photographing optical system has been driven to its focal distance corresponding to a focal distance of the finder optical system at a timing just before an actual photographing operation.

9. The camera according to claim 6, wherein the control circuit is adapted to effect a desired control such that an exposure operation is carried out only after the photographing optical system has been driven so that a photographing magnification may be obtained corresponding to a finder magnification of the finder optical system, at a timing just before an actual photographing operation.

10. The camera according to claim 6, wherein the control circuit is adapted to effect a desired control, such that the photographing optical system is extended by a smaller amount than would be necessary for it to be in a position corresponding to a focal distance of the finder optical system.

11. A camera which has a photographing optical system and a finder optical system existing and moveable independently from each other, said camera comprising:

a driving circuit for respectively driving the photographing optical system and the finder optical system; and a control circuit for controlling the photographing optical system in a manner such that the position of the photographing optical system may be changed in accordance with a focal distance of the finder optical system, so that an image viewed through the finder optical system will not be obstructed by the photographing optical system.

12. A camera which has a photographing optical system and a finder optical system existing independently from each other, said camera comprising:

a driving circuit for respectively driving the photographing optical system and the finder optical system;

a control circuit for controlling the photographing optical system in a manner such that the position of the photographing optical system may be changed in accordance with a focal distance of the finder optical system, so that an image viewed through the finder optical system will not be obstructed by the photographing optical system; and wherein the control circuit is adapted to independently control a focal distance of the photographing optical system and a focal distance of the finder optical system.

13. A camera which has a photographing optical system and a finder optical system existing independently from each other, said camera comprising:

a driving circuit for respectively driving the photographing optical system and the finder optical system;

a control circuit for controlling the photographing optical system in a manner such that the position of the photographing optical system may be changed in accordance with a focal distance of the finder optical system, so that an image viewed through the finder optical system will not be obstructed by the photographing optical system; and wherein the control circuit is adapted to effect a desired control such that an exposure operation is carried out only after the photographing optical system has been driven to its focal distance corresponding to a focal distance of the finder optical system at a timing just before an actual photographing operation.

14. A camera which has a photographing optical system and a finder optical system existing independently from each other, said camera comprising:

a driving circuit for respectively driving the photographing optical system and the finder optical system;

a control circuit for controlling the photographing optical system in a manner such that the position of the photographing optical system may be changed in accordance with a focal distance of the finder optical system, so that an image viewed through the finder optical system will not be obstructed by the photographing optical system; and wherein the control circuit is adapted to effect a desired control such that an exposure operation is carried out only after the photographing optical system has been driven so that a photographing magnification may be obtained corresponding to a finder magnification of the finder optical system, at a timing just before an actual photographing operation.

15. A camera which has a photographing optical system and a finder optical system existing independently from each other, said camera comprising:

a driving circuit for respectively driving the photographing optical system and the finder optical system;

a control circuit for controlling the photographing optical system in a manner such that the position of the photographing optical system may be changed in accordance with a focal distance of the finder optical system so that an image viewed through the finder optical system will not be obstructed by the photographing optical system; and wherein the control circuit is adapted to effect a desired control, such that the photographing optical system is extended by a smaller amount than would be necessary for it to be in a position corresponding to a focal distance of the finder optical system.

16. A camera which has a photographing optical system and a finder optical system existing independently from each other, said camera comprising:

a driving circuit for interlocking and respectively driving the photographing optical system and the finder optical system; and a control circuit for controlling the photographing optical system in a manner such that a focal distance of the photographing optical system is different from a focal distance of the finder optical system, so that an image viewed through the finder optical system will not be obstructed by the photographing optical system.

17. The camera according to claim 16, wherein the driving circuit is adapted to interlock the photographing optical system and the finder optical system in accordance with a predetermined relation of different magnifications, wherein the control circuit is adapted to effect a desired control such that the photographing optical system may be adjusted to have a magnification corresponding to the finder optical system, at a timing just before an exposure operation.

18. A camera having a photographing optical system capable of changing its photographing magnification and a finder optical system capable of changing its observation magnification, both of the systems existing and movable independently from each other, said camera comprising:

a driving circuit for driving the photographing optical system; and a control circuit adapted to effect a control such that the photographing optical system may be located in a position capable of preventing an eclipse phenomenon in the finder optical system, and that the photographing optical system may be moved to a photographing position during an initial period of a photographing operation.

19. The camera according to claim 18, wherein the position capable of preventing an eclipse phenomenon in the finder optical system, is located between a photographing position and a lens-barrel retracted position.

20. A camera having a photographing optical system and a finder optical system existing and movable independently from each other, said camera comprising:

a driving circuit for respectively driving the photographing optical system and the finder optical system; and a control circuit for controlling the photographing optical system in a manner such that an image viewed through the finder optical system will not be obstructed by the photographing optical system.

21. A camera according to claim 20, wherein said control circuit controls positioning of the photographing optical system so that it is close to the exfocal distance, but does not obstruct the finder optical system thereby reducing the time required to move the photographing optical system to a photographing position.

22. A camera according to claim 20 wherein the control circuit controls focal distance to the photographing optical system be smaller than the focal distance of the finder optical system in an observing state of the finder optical system to prevent a portion of a view field at a focal distance of the finder optical system from being obstructed by the photographing optical system at a focal distance which corresponds to the focal distance of the finder optical system.

23. A camera according to claim 20 wherein the control circuit resets the photographing optical system to the position occupied prior to the photographing operation.

24. A camera according to claim 20 wherein the control circuit memorizes a position occupied prior to the photographing operation and returns the photographing optical system to the memorized position.

25. A camera according to claim 20 wherein the control circuit changes a focal distance of the photographing optical system in accordance with stored data.

26. A camera having a photographing optical system and a finder optical system existing independently from each other, said camera comprising:

a driving circuit for driving the photographing optical system; and a control circuit adapted to effect a desired control, such that the photographing optical system may be located in a position capable of preventing an eclipse phenomenon in the finder optical system, and that if a photographing magnification of the photographing optical system is different from an observation magnification of the finder optical system, the photographing optical system may be moved to a position capable of rendering a photographing magnification of the photographing optical system to be substantially equal to an observation magnification of the finder optical system during an entire period of an actual photographing operation.

* * * * *

UNITED STATES PATENT AND TRADEMARK OFFICE
CERTIFICATE OF CORRECTION

PATENT NO. : 6,571,059 B1
DATED : May 27, 2003
INVENTOR(S) : Kodama et al.

It is certified that error appears in the above-identified patent and that said Letters Patent is hereby corrected as shown below:

Column 4,
Line 13, delete "6c" and insert -- 6e --.
Line 59, delete "lens berral" and insert -- lens-barrel --.

Column 9,
Lines 20 and 21, delete "winded" and insert -- wound --.

Column 10,
Line 19, delete "step, S28" and insert -- step S28 --.
Line 21, delete "step, S24" and insert -- step S24 --.
Line 26, delete "a".

Signed and Sealed this

Sixth Day of July, 2004

JON W. DUDAS
*Acting Director of the United States Patent and Trademark Office*